(12) United States Patent
Ely

(10) Patent No.: US 10,970,815 B2
(45) Date of Patent: Apr. 6, 2021

(54) MULTI-SOURCE IMAGE FUSION

(71) Applicant: Raytheon Company, Waltham, MA (US)

(72) Inventor: Richard W. Ely, Lewisville, TX (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 16/364,969

(22) Filed: Mar. 26, 2019

(65) Prior Publication Data

US 2020/0020072 A1 Jan. 16, 2020

Related U.S. Application Data

(60) Provisional application No. 62/696,107, filed on Jul. 10, 2018.

(51) Int. Cl.
*G06T 3/00* (2006.01)
*G06T 7/30* (2017.01)
(Continued)

(52) U.S. Cl.
CPC .......... *G06T 3/0075* (2013.01); *G06T 3/4038* (2013.01); *G06T 7/30* (2017.01);
(Continued)

(58) Field of Classification Search
CPC ........... G06T 17/05; G06T 2207/20221; G06T 3/0075; G06T 3/4038; G06T 7/30;
(Continued)

(56) References Cited

U.S. PATENT DOCUMENTS 5,552,787 A * 9/1996 Schuler .................. G01S 7/024
342/25 A
8,239,175 B2 8/2012 Wivell et al.
(Continued)

FOREIGN PATENT DOCUMENTS

EP 2687817 1/2014
WO WO-2020014341 A1 1/2020
WO WO-2020014347 A1 1/2020

OTHER PUBLICATIONS

Hirschmugl, Manuela, et al. "Integrative use of SAR and optical data for forest mapping in the Congo basin." Proceedings of the International Conference of the African Association of Remote Sensing and the Environment (AARSE), 2012. (Year: 2012).*
(Continued)

*Primary Examiner* — Daniel F Hajnik
(74) *Attorney, Agent, or Firm* — Schwegman Lundberg & Woessner, P.A.

(57) ABSTRACT

A method can include registering a first image of a region to a three-dimensional (3D) point set of the region to generate a registered first image, registering a second image of the region to the 3D point set to generate a registered second image, identifying, based on the 3D point set, geometric tie points of the registered first image and the registered second image, projecting, using an affine transformation determined based on the identified geometric tie points, pixels of the registered first image to an image space of the registered second image to generate a registered and transformed first image, and displaying the registered and transformed first image and the registered second image simultaneously.

20 Claims, 6 Drawing Sheets

(51) Int. Cl.
*G06T 3/40* (2006.01)
*G06T 7/33* (2017.01)

(52) U.S. Cl.
CPC .... *G06T 7/344* (2017.01); *G06T 2207/10024* (2013.01); *G06T 2207/10028* (2013.01); *G06T 2207/10032* (2013.01); *G06T 2207/10048* (2013.01); *G06T 2207/20221* (2013.01); *G06T 2207/30181* (2013.01)

(58) Field of Classification Search
CPC ........... G06T 7/344; G06T 2207/10024; G06T 2207/10028; G06T 2207/10032; G06T 2207/1048; G06T 2207/30181
See application file for complete search history.

(56) References Cited

U.S. PATENT DOCUMENTS

| | | | |
|---|---|---|---|
| 9,245,201 | B1 | 1/2016 | Jin et al. |
| 9,269,145 | B2 | 2/2016 | Ely et al. |
| 9,275,267 | B2 | 3/2016 | Verret |
| 2005/0220363 | A1 | 10/2005 | Oldroyd |
| 2006/0215935 | A1* | 9/2006 | Oldroyd ............... G01C 11/00 382/294 |
| 2008/0103699 | A1* | 5/2008 | Hanna ................. G01S 17/86 702/5 |
| 2008/0147325 | A1* | 6/2008 | Maassel ............... G06T 17/05 702/5 |
| 2012/0274505 | A1* | 11/2012 | Pritt ................... G01S 13/904 342/25 A |
| 2014/0112536 | A1 | 4/2014 | Ely et al. |
| 2015/0172626 | A1 | 6/2015 | Martini |
| 2015/0371431 | A1* | 12/2015 | Korb ............... G06K 9/00208 382/113 |
| 2016/0321820 | A1 | 11/2016 | Ely |
| 2017/0069092 | A1 | 3/2017 | Bell |
| 2018/0304468 | A1 | 10/2018 | Holz |
| 2020/0020115 | A1 | 1/2020 | Ely |

OTHER PUBLICATIONS

"International Application Serial No. PCT US2019 041185, International Search Report dated Sep. 27, 2019", 5 pgs.
"International Application Serial No. PCT US2019 041185, Written Opinion dated Sep. 27, 2019", 7 pgs.
"Image registration [Harris Geospatial Docs Center]", https: web.archive.org web 20171013044442 https: www.harrisgeospati al.com docs ImageRegi strati on.html, Oct. 2017.
"International Application Serial No. PCT US2019 041176, International Search Report dated Sep. 27, 2019", 5 pgs.
"International Application Serial No. PCT US2019 041176, Written Opinion dated Sep. 27, 2019", 7 pgs.
Compton, J Tucker, "NASA's Global Orthorectified Landsat Data Set", Photogrammetric Engineering and Remote Sensing, vol. 70, No. 3, (Mar. 1, 2004), 313-322.
Jong-Il, Park, "Hierarchical depth mapping from multiple cameras", In: Serious Games, (Jan. 1, 1997), 685-692.
Oliver, Schreer, "3D Video communication: Algorithms, concepts and real-time systems in human centred aommunication", In: 3D videocommunication : algorithms, concepts and real-time systems in human centred communication, (Sep. 1, 2005), 119-120.
"U.S. Appl. No. 16/507,798, Examiner Interview Summary dated Oct. 23, 2020", 3 pgs.
"U.S. Appl. No. 16/507,798, Non Final Office Action dated Aug. 7, 2020", 32 pgs.
Fisher, et al., "Sobel Edge Detector", [Online]. Retrieved from the Internet: <https://homepages.inf.ed.ac.uk/rbf/HIPR2/sobel.htm>, (2017).

\* cited by examiner

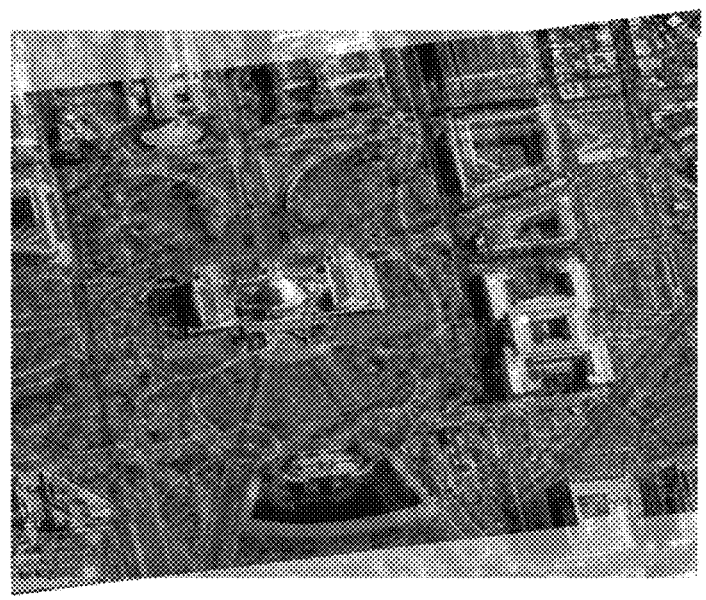
FIG. 8 BLENDED IMAGES
FIG. 7 SECOND IMAGE
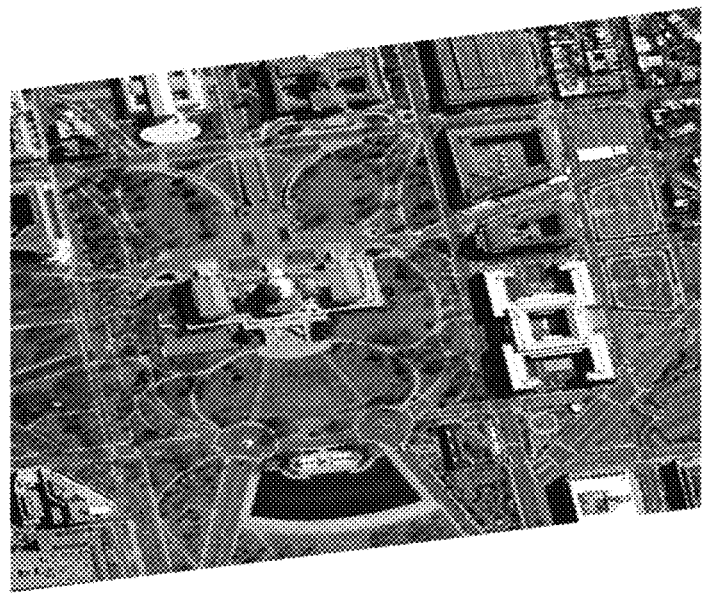
FIG. 6 TRANSFORMED FIRST IMAGE

MULTI-SOURCE IMAGE FUSION

CROSS-REFERENCE TO RELATED APPLICATION

This patent application claims the benefit of U.S. Provisional Patent Application No. 62/696,107, filed Jul. 10, 2018, entitled "IMAGE REGISTRATION TO A 3D POINT SET", which is incorporated by reference herein in its entirety.

TECHNICAL FIELD

Embodiments discussed herein regard devices, systems, and methods for fusing image pixels of images from same or different types of (e.g., sensors). Embodiments can provide fusion without voids.

BACKGROUND

In certain applications, images from different sources may be processed in a manner to fuse (e.g., combine, overlay, augment, or the like) such images. In some cases, one image may be projected through a point cloud to the other image for such fusion. However, such a projection can leave voids in the resulting fused image. For some applications, the presence of voids is unacceptable. Thus, it can be advantageous to facilitate fusing image chips from two or more sources without voids.

SUMMARY

Image fusion may include registering images from disparate sensor types to a high-resolution three-dimensional (3D) point cloud and updating the geometries of both images to match the 3D point cloud. This allows one image to be projected through the point cloud to the other image to fuse them. However, such a projection may leave voids. At least some of the voids can be due to occlusions in the image being projected and at least some of voids can be due to voids in the point cloud itself. For some applications, the presence of voids is unacceptable. For these applications it can be preferable to have less accurate fusion than to have voids. Embodiments herein can fuse images without voids while still taking advantage of a high accuracy registration to a 3D point cloud.

Various embodiments generally relate to devices, systems, and methods for fusing image data of images from different sources, such as images from two or more sensors. In some embodiments, the techniques described herein may be used for fusing image data of images from the same source, (e.g., two images from the same sensor). The image fusion can be of image data corresponding to a same or substantially same region, such as a geographical region, a building, a vehicle (e.g., a manned or unmanned vehicle), or other object, or the like. In accordance with one aspect of the disclosure, an example method for fusing images comprises: registering a first image of a region to a 3D point set of the region to generate a registered first image, registering a second image of the region to the 3D point set to generate a registered second image; identifying, based on the 3D point set, geometric tie points of the registered first image and the registered second image; and projecting, using an affine transformation determined based on the identified geometric tie points, pixels of the registered first image to an image space of the registered second image to generate a registered and transformed first image. In some embodiments, the method further comprises displaying the registered and transformed first image and the registered second image superimposed.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 6 illustrates, by way of example, a diagram of an embodiment of an image after registration and transformation.

FIG. 7 illustrates, by way of example, a diagram of an embodiment of an image after registration.

FIG. 8 illustrates, by way of example, a diagram of an embodiment of an image after the method is performed on the first image and the second image.

DETAILED DESCRIPTION

Figure 1:
FIG. 1 illustrates, by way of example, a diagram of an embodiment of an electro-optical (EO) image of the Capitol Building area of Washington, D.C.
Figure 2:
FIG. 2 illustrates, by way of example, a diagram of an embodiment of a synthetic-aperture radar (SAR) image of the Capitol Building area in Washington D.C.

A portion of the disclosure of this patent document contains material which may be subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever. FIG. 1 is an image provided using data retrieved from DC Data Catalog (http://data.dc.gov/). FIG. 2 is an image provided courtesy of Sandia National Laboratories, Radar ISR.

Embodiments generally relate to devices, systems, and methods for fusing image data of images from different sources. The image fusion can be of image data corresponding to a same region, such as a geographical region, a building, a vehicle (e.g., a manned or unmanned vehicle), or other object, or the like.

A passive three-dimensional (P3D) point set can be extracted from imagery. The passive 3D point set models the surface of the visible scene including 3D structures, such as portions of buildings (e.g., walls, windows, roofs, etc.), and vegetation (e.g., trees, shrubs, grass, etc.). Other elevation data can be generated of a same geographical area. Elevation data can be from a digital elevation model (DEM) or other 3D point set. A difference between the DEM and other 3D point sets can include the DEM having a regular spacing between points, while other 3D point sets have irregular spacing between points.

Bare earth elevation alters a surface 3D point set so that, when the bare earth points are viewed, the image models a view of a geographic location as if buildings and trees or other foliage were not there. A surface elevation data set does not include such an alteration. A 3D point set, very likely includes voids that are caused by the data used to generate the 3D point set.

Embodiments herein do not introduce voids when projecting one image space to another image space. Embodiments can avoid voids by using a transformation (an affine transformation) that transforms one image space to the other image space, such as at a specific elevation (e.g., a ground elevation at the center of the image space, an average elevation over a range of points in the 3D point set, a percentile of the elevation distribution of the points in the 3D point set, or the like). Embodiments herein provide a process for creating the affine transformation and applying it to the images to be fused.

FIG. 1 illustrates, by way of example, a diagram of an embodiment of an electro-optical (EO) image 100 of the Capitol Building area of Washington, D.C. FIG. 2 illustrates, by way of example, a diagram of an embodiment of a synthetic-aperture radar (SAR) image 200 of the Capitol Building area in Washington D.C. The images 100, 200 are collected from different perspectives. The EO image 100 was captured from almost directly overhead relative to the Capitol Building and the SAR image was collected from a more southerly perspective relative to the Capitol Building. These example images 100, 200 will be used to illustrate the process of fusing images using embodiments. It should be appreciated that EO and SAR are just two types of images used for illustration purposes to which embodiments apply. Other types of images, such as multi-spectral, infrared (IR), or other image types that may be captured using other sensor types can be used in place of the EO or SAR image.

Figure 3:
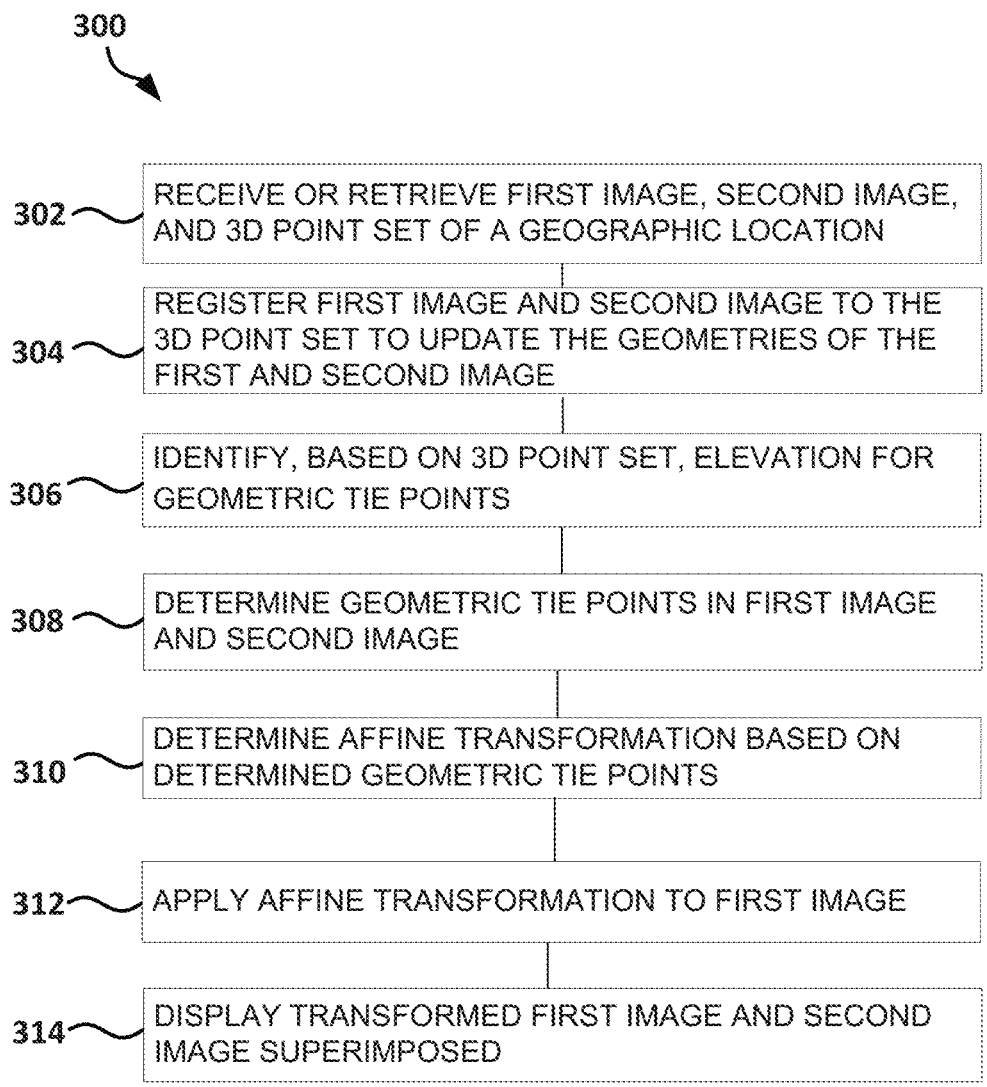
FIG. 3 illustrates, by way of example, a diagram of an embodiment of a method for fusing images.

FIG. 3 illustrates, by way of example, a diagram of an embodiment of a method 300 for aligning images, such as for subsequent image fusion. The method 300 as illustrated includes receiving or retrieving a first image, second image, and a 3D point set of a geographic location, at operation 302; registering the first image to the 3D point set to update the geometry of the first image and registering the second image to the 3D point set to update the geometry of the second image, at operation 304; identifying, based on the 3D point set, an elevation for a grid of geometric tie points in the first and second registered images, at operation 306; projecting the grid of geometric tie points to the first and second registered images, respectively, to determine tie point coordinates 308; determining an affine transformation between the determined tie point coordinates of the first image and the determined tie point coordinates of the second image, at operation 310; applying the affine transformation to pixels of the registered first image, at operation 312; and displaying the transformed and registered first image superimposed with (on or under) the registered second image, at operation 314.

Examples of the first image and second image that can be received or retrieved at operation 302 are provided in FIGS. 1 and 2, respectively. As previously discussed the first image 100 and the second image 200 can include a same or different type of image. Types of images can include a color image, grayscale image, infrared image, SAR image, multi-spectral image, among others.

The 3D point set can include a digital elevation model (DEM), digital surface model (DSM), digital terrain model (DTM), bare earth DEM, or other 3D point cloud of a geographic area or other region or object. The 3D point set can include latitude, longitude, and elevation data for each pixel (sometimes called point) in the 3D point set or can include data in a Universal Transverse Mercator (UTM) coordinate system.

The operation 304 can include aligning two or more images of a same scene with reference to a particular image. In the example of FIG. 1, the first image 100 and the second image 200 are registered, individually, to the 3D point set. The images can be captured from same or different sensors, such as at same or different times, or at same or different view-points (e.g., imaging perspectives). There are many techniques for performing operation 304. Image registration techniques include intensity-based and feature-based registration techniques. Source images, the first image 100 and the second image 200, are aligned with a reference image, the 3D point set. Intensity-based registration compares intensity patterns, usually using correlation metrics. Feature-based techniques find correspondence between unique features (e.g., points, lines, contours, objects, or the like) of the images. Some image registration techniques use a combination of both intensity and feature based techniques.

Some registration techniques are linear, while others are non-linear (sometimes called "elastic" or "non-rigid"). Examples of linear transformations include affine transformations. Examples of non-linear transformations include radial-basis transforms, physical continuum models, and large deformation models. Some transformations can be performed in the spatial domain, while others can be performed in the frequency domain.

A registration technique, using ground control points (GCPs) (e.g., a known ground location and a known image location for that ground location) can be used to perform operation 304. From all the extracted GCPs, the imaging geometry of the image can be updated to match the GCPs. Adjusting the geometry of the image is now summarized. Image metadata can include an estimate of the camera location and orientation at the time the image was collected, along with camera parameters, such as focal length. If the metadata was perfectly consistent with the 3D point cloud, then every 3D point would project exactly to the correct spot in the image. For example, the base of a flag pole in the 3D point set would project exactly to where one sees the base of the flag pole in the image. But, in reality, there are inaccuracies in the metadata of the image. If the estimate of the camera position is off a little, or if the estimated camera orientation is not quite right, then the 3D ground point representing the base of the flag pole will not project exactly to the pixel of the base in the image. But with the adjusted geometry the base of the flag will project very closely to where the base is in the image. The result of the registration is adjusted geometry for each image. Since both images 100 and 200 are both adjusted to the same 3D point set, their geometries are consistent with each other. Again, any registration process can be used that results in an adjusted geometry for each image being consistent with the 3D point cloud. The updated geometries resulting in the registered images facilitate alignment of the two images.

After each image 100, 200 has been registered to the 3D point set, the registered first image could be projected through the 3D point set to the space of the second image. Locations that are visible from the imaging perspective of the registered first image will fuse correctly with the registered second image even for locations that fall in a shadow of the second image 200. However, there are locations visible in the second image 200 that are occluded in the first image 100. For example, since the image 100 is viewed from almost directly overhead, the south facing walls seen by the SAR sensor in image 200 are not visible in image 100. And if the image 100 had been collected from an off-nadir perspective the ground on opposite sides of the buildings would be occluded in image 100, creating a void when projected through the 3D point cloud into the space of image 200.

Because the collection geometry of the second image 200 is from a southerly perspective, the building walls and surfaces on the south side of the Capitol Building are not occluded from the imaging perspective of the second image 200. When the image 100 is projected to the image space of the second image 200, there are no valid pixels (corresponding to the occluded locations) in the first image 100 from which to populate the image in the projected space. The pixels in these areas are voids. The same would be true if image 100 had been collected from a different perspective, say from the west. The ground on the east side of the Capitol Building would be visible in image 200 but occluded in image 100 resulting in void areas when the image 100 pixels are projected to image 200 space. As previously discussed, such voids can be unacceptable in some applications.

Similarly, voids in the 3D point set (places with no 3D knowledge) also introduce voids in the projected image. In cases where voids are not acceptable, an interesting question that emerges sometimes is what intensities to use for the void pixels. One option is to make them black. However, this may be problematic because the black regions in the projected image may be mistaken for shadows rather than voids. Another option is to mark them with a color that does not occur frequently in images (either in natural or man-made scenes), such as bright purple, so that the void areas are obvious to an image analyst. This technique can be acceptable for human exploitation of the fused image, but can cause problems for a machine learning algorithm that has not been programmed or trained to handle the voids.

As previously discussed, there are applications of image fusion, both human exploitation and automated technique, in which void pixels are undesirable, so much so that an increased pixel fusion imprecision can be preferred over voids. Therefore, techniques to transform one image to an image space of another image can be desired. In some embodiments, the transformation can be accomplished using an affine transform as described herein, rather than geometric projection through the 3D point cloud to another image space.

Another technique of performing operation 304 can include locating control points (CPs) in the first image 100 and the second image 200. The CPs can be derived from the 3D point set. e The CPs can be used to perform a geometric bundle adjustment that brings the geometry of the first image 100 and the second image 200 into alignment with the 3D point set (and therefore with each other). The result is that any physical 3D point in the 3D point set projects accurately to a corresponding pixel in each of the first image 100 and the second image 200. However, as mentioned previously, the projection process can result in void pixels when the perspectives of the two images are different or if there are voids in the 3D point set. Thus, a different process of transforming an image space of the first image to an image space of the second image (or vice versa) is desired.

At operation 306, the 3D point set can be used to establish geometric tie points. A tie point is a four-tuple (row 1, column 1, row 2, column 2) that indicates a row and column of the first image (row 1, column 1) that maps to a corresponding row and column of the second image (row 2, column 2). The geometric tie points can be determined based on an elevation about or around a center of the image 100, 200 (or portion of the image 100, 200) to be transformed. In some embodiments, this elevation can be the elevation of the nearest 3D point to the center of the 3D point set. In other embodiments, the elevation can be the minimum, median, mode, average, or other elevation as calculated over a range of points in the image 100, 200 or a portion thereof. In general, the geometric tie points can be an elevation that approximately represents ground level near a center of overlap of the two images (or the region of interest for the fusion). The operation can include histogramming the elevation (sometimes called "Z") values of the P3D points in an area near the center of the region of interest and using an elevation at some percentile of the histogrammed elevations. The percentile can be the median, (e.g., $50^{th}$ percentile) or some lower percentile. Passive 3D (P3D) is 3D points derived from imagery, as opposed to 3D from active sources, such as LiDAR. Either can be used in embodiments.

The operations 306 and 308 can be for generating an affine transformation at operation 310 to be applied to the registered first image at operation 312. The operation 308 can include laying out a regular grid of points in x, y ground space at the elevation identified at operation 306 (see FIGS. 4 and 5). Each point in the grid can be projected to its corresponding image using the adjusted geometry of each image at operation 308. Each projected point of the grid is a geometric tie point. Corresponding geometric tie points in the first and second images form a geometric tie point coordinate.

Figure 5:
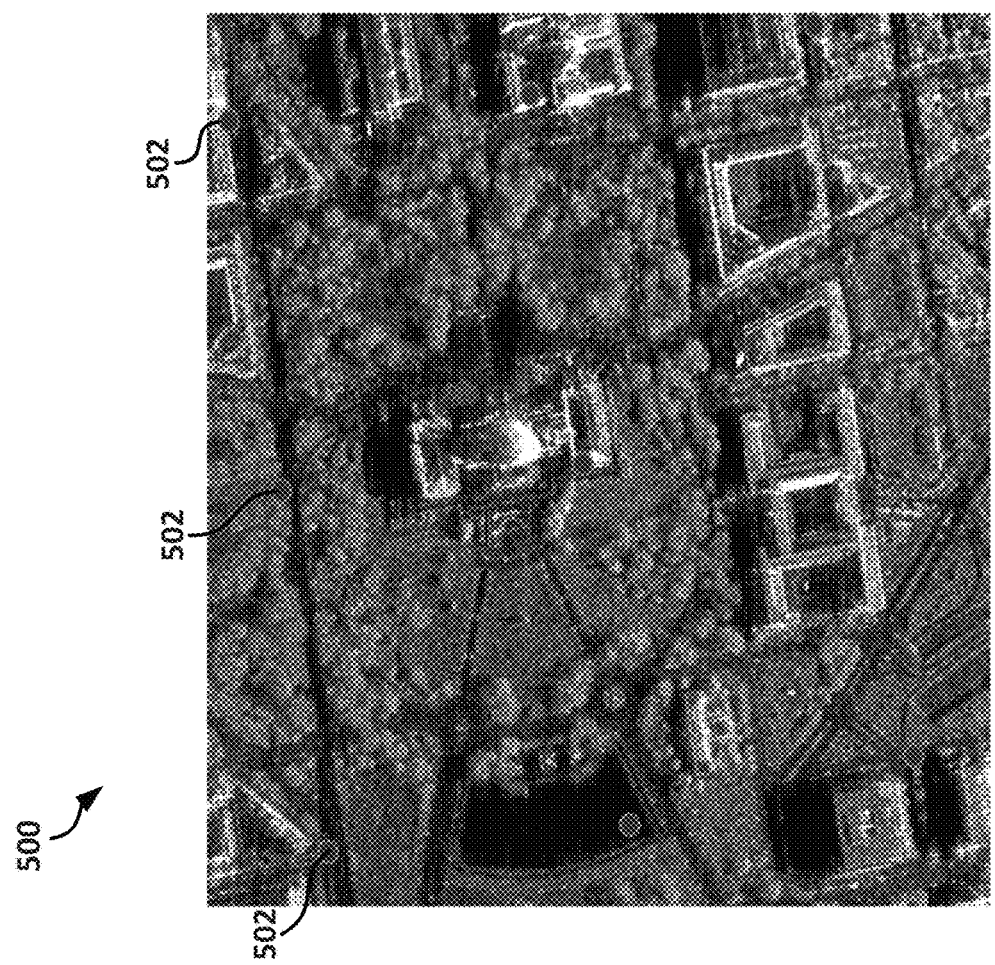
FIGS. 4 and 5 illustrate, by way of example, respective diagrams of images with geometric tie points.
Figure 4:
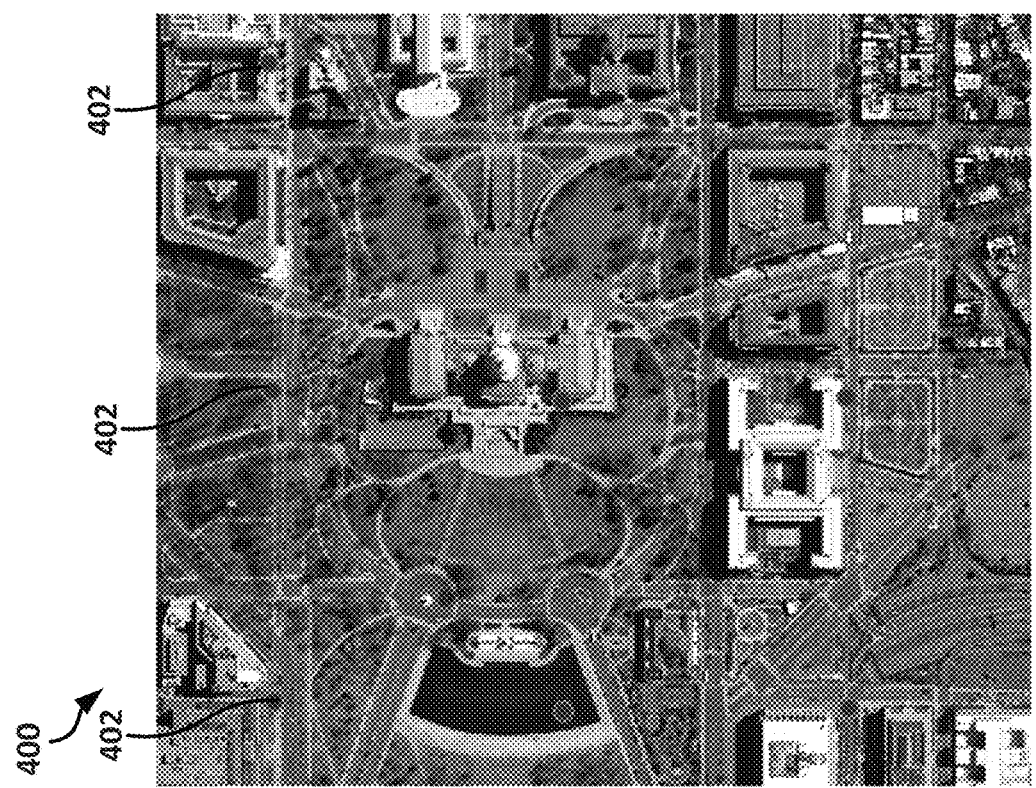

FIGS. 4 and 5 illustrate, by way of example, diagrams of images 400 and 500, respectively. The images 400 and 500 include the first image 100 and second image 200 after registration and with identified geometric tie points 402 and 502. The geometric tie points 402, 502 can be used to establish tie points between pixels of the first image 100 and pixels of the second image 200. The set of geometric tie points 402 and 502 can be a regular grid of points at the identified elevation.

The operation 310 can include determining the affine transformation that maps the tie points of the first image to the tie points of the second image. Sometimes the tie points are called geometric tie points. At operation 312, the affine transformation determined at operation 310 can be applied to the first image and use that affine to transform the first image to the space of the second image.

At operation 310, an affine transformation between the two images can be identified or determined, such as based on the geometric tie points. The affine transformation can be determined using a least squares fit to the geometric tie points between the first image 100 and the second image 200. One of the images 100, 200 can then be transformed to the image space of the other image, such as by applying the identified or determined affine transformation to each pixel. The result of the affine transformation indicates the pixel in the other image corresponding to a given pixel in a source image. Since the affine transformation of operation 310 does not project a destination pixel exactly to the center of a pixel in the source image, bilinear, or other interpolation, can be applied to the intensities of the 2×2 set of pixels nearest the projected location, such as to identify the proper pixel location in the source image.

An affine transformation is a linear mapping that preserves points, straight lines, planes. That is, parallel lines in a source image remain parallel after an affine transformation to a destination image. Different affine transformations include translation, scale, shear, and rotation. The affine transformation of operation 310 translates a location in the first image 100 to a location in the second image 200 based on a projected location of geometric tie points 402 in the first image 400 relative to a corresponding projected location of geometric tie points 502 in the second image 500.

FIG. 6 illustrates, by way of example, a diagram of an embodiment of an image 600 after registration and transformation. The image 600 is the first image 100 after the operations 302, 304, 306, 308, 310, and 312 have been performed. FIG. 7 illustrates, by way of example, a diagram of an embodiment of an image 200.

FIG. 8 illustrates, by way of example, a diagram of an embodiment of an image 800 after the method 300 is performed using the first image 100 and the second image 200. The image 800 includes the images 600 and 200 superimposed on each other. Note that there are no voids in the transformed first image and that the two images fuse well even though the transformation was generated at a single elevation plane.

Because the transformation does not depend on the 3D point cloud, other than establishing the center elevation and for registration, voids in the 3D point cloud do not result in voids in the transformed image. Further, occlusions do not introduce voids because there will always be an interpolated pixel intensity to fill each pixel in the destination image. The output is a fused pair of images with no voids in the transformed image.

The synthetic image generation technique was tested on more than one hundred (100) images from sixteen different sites with typical registration accuracy to the synthetic image of less than a pixel in the bundle adjusted geometry. Since local pixel-by-pixel 3D knowledge is not used in embodiments, the accuracy of the fusion from the affine transformation depends on the scene content and the disparity in the imaging perspectives of the two images.

Embodiments leverage precise registration and geometric adjustment of a 2D image to 3D image registration as the geometry used to calculate the transformation. It also uses the 3D point cloud to establish the best elevation plane at which to create the affine that transforms the first image 100 to the space of the second image 200.

Figure 9:
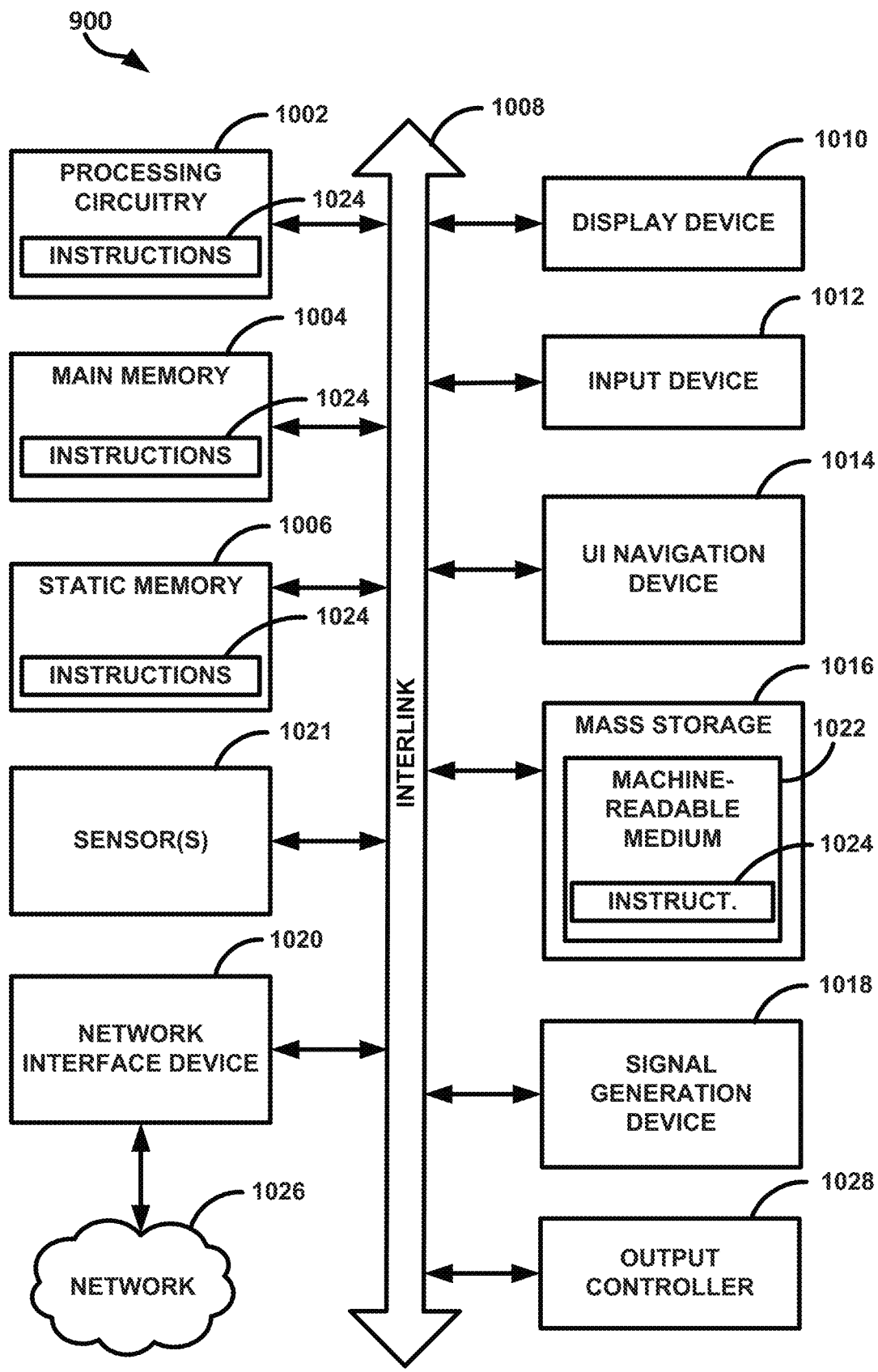
FIG. 9 illustrates, by way of example, a block diagram of an embodiment of a machine on which one or more of the methods, such as those discussed about FIGS. 1-8 can be implemented.

FIG. 9 illustrates, by way of example, a block diagram of an embodiment of a machine 900 on which one or more of the methods, such as those discussed about FIGS. 1-8 can be implemented. In one or more embodiments, one or more operations of the method 300 can be implemented by the machine 900. In alternative embodiments, the machine 900 operates as a standalone device or may be connected (e.g., networked) to other machines. In a networked deployment, the machine 900 may operate in the capacity of a server or a client machine in server-client network environment, or as a peer machine in a peer-to-peer (or distributed) network environment. The machine 900 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 900 includes processing circuitry 1002 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1021 (e.g., a transducer that converts one form of energy (e.g., light, heat, electrical, mechanical, or other energy) to another form of energy), or the like, or a combination thereof), a main memory 1004 and a static memory 1006, which communicate with each other and all other elements of machine 900 via a bus 1008. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 900 (e.g., computer system) may further include a video display unit 1010 (e.g., a liquid crystal display (LCD) or a cathode ray tube (CRT)). The machine 900 also includes an alphanumeric input device 1012 (e.g., a keyboard), a user interface (UI) navigation device 1014 (e.g., a mouse), a disk drive or mass storage unit 1016, a signal generation device 1018 (e.g., a speaker) and a network interface device 1020.

The mass storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processing circuitry 1002 during execution thereof by the machine 900, the main memory 1004 and the processing circuitry 1002 also constituting machine-readable media. One or more of the main memory 1004, the mass storage unit 1016, or other memory device can store the job data, transmitter characteristics, or other data for executing the method 300.

The machine 900 as illustrated includes an output controller 1028. The output controller 1028 manages data flow to/from the machine 900. The output controller 1028 is sometimes called a device controller, with software that directly interacts with the output controller 1028 being called a device driver.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of several well-known transfer protocols (e.g., hypertext transfer protocol (HTTP), user datagram protocol (UDP), transmission control protocol (TCP)/internet protocol (IP)). The network 1026 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include a method for fusing images, the method comprising registering a first image of a region to a three-dimensional (3D) point set of the region to generate a registered first image, registering a second image of the region to the 3D point set to generate a registered second image, identifying, based on the 3D point set, geometric tie points of the registered first image and the registered second image, projecting, using an affine transformation determined based on the identified geometric tie points, pixels of the registered first image to an image space of the registered second image to generate a registered and transformed first image, and displaying the registered and transformed first image and the registered second image simultaneously.

In Example 2, Example 1 can further include, wherein the first image is generated using a first optical device and the second image is generated using a second, different optical device.

In Example 3, at least one of Examples 1-2 can further include, wherein the first image is of a first image type including one of an electro-optical (EO) image, a synthetic aperture radar (SAR) image, an infrared (IR) image, and a multi-spectral image, and the second image is of a second, different image type.

In Example 4, at least one of Examples 1-3 can further include, wherein the geometric tie points are at substantially a same elevation based on the 3D point set.

In Example 5, Example 4 can further include, wherein the geometric tie points are situated in a regular grid on the first and second images.

In Example 6, Example 5 can further include, wherein x,y points of the grid are projected to the image space of the first image and the second image to generate geometric tie point coordinates between the images. In Example 7, Example 6 can further include generating the affine transformation to project the geometric tie point coordinates in the first image to the geometric tie point coordinates in the second image.

In Example 8, at least one of Examples 1-7 can further include determining a corresponding pixel in the registered image to which a transformed projected first image pixel of the transformed projected first image pixels corresponds using a bilinear interpolation.

Example 9 includes a system for fusing images, the system comprising processing circuitry configured to registering a first image of a region to a three-dimensional (3D) point set of the region to generate a registered first image, registering a second image of the region to the 3D point set to generate a registered second image, identifying, based on the 3D point set, geometric tie points of the registered first image and the registered second image, projecting, using an affine transformation determined based on the identified geometric tie points, pixels of the registered first image to an image space of the registered second image to generate a registered and transformed first image, and a display to provide a view of the registered and transformed first image and the registered second image simultaneously.

In Example 10, Example 9 can further include, wherein the first image is generated using a first optical device and the second image is generated using a second, different optical device.

In Example 11, at least one of Examples 9-10 can further include, wherein the first image is of a first image type including one of an electro-optical (EO) image, a synthetic aperture radar (SAR) image, an infrared (IR) image, and a multi-spectral image, and the second image is of a second, different image type.

In Example 12, at least one of Examples 9-11 can further include, wherein the geometric tie points are at a same elevation determined based on the 3D point set.

In Example 13, Example 12 can further include, wherein the geometric tie points are situated in a regular grid on the first and second images.

In Example 14, Example 13 can further include, wherein the geometric tie points are formed from projecting a regular grid of x, y points at the same elevation to the space of the first and second images.

In Example 15, Example 14 can further include, wherein the processing circuitry is further configured to generate the affine transformation to project the geometric tie point coordinates in the first image to the geometric tie point coordinates in the second image.

In Example 16, at least one of Examples 9-15 can further include determining a corresponding pixel in the registered image to which a transformed projected first image pixel of the transformed projected first image pixels corresponds using a bilinear interpolation.

Example 17 includes at least one non-transitory machine-readable medium including instructions, that when executed by a machine, configure the machine to perform operations comprising registering a first image of a region to a three-dimensional (3D) point set of the region to generate a registered first image, registering a second image of the region to the 3D point set to generate a registered second image, identifying, based on the 3D point set, geometric tie points of the registered first image and the registered second image, projecting, using an affine transformation determined based on the identified geometric tie points, pixels of the registered first image to an image space of the registered second image to generate a registered and transformed first image, and providing signals that cause a display to provide a view of the registered and transformed first image and the registered second image simultaneously.

In Example 18, Example 17 can further include, wherein the first image is generated using a first optical device and the second image is generated using a second, different optical device.

In Example 19, at least one of Examples 17-18 can further include, wherein the first image is of a first image type including one of an electro-optical (EO) image, a synthetic aperture radar (SAR) image, an infrared (IR) image, and a multi-spectral image, and the second image is of a second, different image type.

In Example 20, at least one of Examples 17-19 can further include, wherein the geometric tie points are at a same elevation determined based on the 3D point set.

In Example 21, Example 20 can further include, wherein the geometric tie points are situated in a regular grid on the first and second images.

In Example 22, Example 21 can further include, wherein the geometric tie points are projected to the image space of the first image and the second image to generate geometric tie point coordinates between the images.

In Example 23, Example 22 can further include, wherein the processing circuitry is further configured to generate the affine transformation to project the geometric tie point coordinates in the first image to the geometric tie point coordinates in the second image.

In Example 24, at least one of Examples 17-23 can further include determining a corresponding pixel in the registered image to which a transformed projected first image pixel of the transformed projected first image pixels corresponds using a bilinear interpolation.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for fusing images, the method comprising:
adjusting, using ground control points (GCPs), image geometry in metadata of a two-dimensional (2D) first image of a region to match image geometry of a three-dimensional (3D) point set of at least a portion of the region to generate a registered first image, the GCS independent of the 3D point set;
adjusting, using the GCPs, image geometry in metadata of a 2D second image of at least the portion of the region to match the image geometry of the 3D point set to generate a registered second image;
identifying, based on the 3D point set, geometric tie points of the registered first image and the registered second image; and
projecting, using an affine transformation determined based on a least squares fit of the identified geometric tie points, pixels of the registered first image to an image space of the registered second image to generate a registered and transformed first image.

2. The method of claim 1, further comprising displaying the registered and transformed first image and the registered second image simultaneously.

3. The method of claim 1, wherein the 2D first image is generated using a first optical device and the 2D second image is generated using a second, different optical device.

4. The method of claim 1, wherein the 2D first image is of a first image type including one of an electro-optical (EO) image, a synthetic aperture radar (SAR) image, an infrared (IR) image, and a multi-spectral image, and the 2D second image is of a second, different image type.

5. The method of claim 4, wherein the geometric tie points are situated in a regular grid on the registered first and second images.

6. The method of claim 5, wherein x, y points of the grid are projected to the image space of the registered first image and the registered second image to generate geometric tie point coordinates between the images.

7. The method of claim 6, further comprising generating the affine transformation to project the geometric tie point coordinates in the registered first image to the geometric tie point coordinates in the registered second image.

8. The method of claim 1, wherein the geometric tie points are at substantially a same elevation based on the 3D point set.

9. The method of claim 1, further comprising determining a corresponding pixel in the registered image to which a transformed projected first image pixel of the transformed projected first image pixels corresponds using a bilinear interpolation.

10. The method of claim 1, wherein the 2D first image and the 2D second image are captured from different perspectives.

11. A system for fusing images, the system comprising:
processing circuitry configured to:
adjust, using ground control points (GCPs), image geometry in metadata of a two-dimensional (2D) first image of a region to match image geometry of a three-dimensional (3D) point set of the region to generate a registered first image, the GCPs independent of the 3D point set;
adjust, using the GCPs, image geometry in metadata of a 2D second image of the region to match image geometry of the 3D point set to generate a registered second image;
identifying, based on the 3D point set, geometric tie points of the registered first image and the registered second image;
projecting, using an affine transformation determined based on a least squares fit of the identified geometric tie points, pixels of the registered first image to an image space of the registered second image to generate a registered and transformed first image; and
a display to provide a view of the registered and transformed first image and the registered second image simultaneously.

12. The system of claim 11, wherein the 2D first image is generated using a first optical device and the 2D second image is generated using a second, different optical device.

13. The system of claim 11, wherein the 2D first image is of a first image type including one of an electro-optical (EO) image, a synthetic aperture radar (SAR) image, an infrared (IR) image, and a multi-spectral image, and the 2D second image is of a second, different image type.

14. The system of claim 11, wherein the geometric tie points are at a same elevation determined based on the 3D point set.

15. The system of claim 14, wherein the geometric tie points are situated in a regular grid on the registered first and second images.

16. The system of claim 15, wherein x, y points of the grid are projected to the image space of the registered first image and the registered second image to generate geometric tie point coordinates between the images.

17. At least one non-transitory machine-readable medium including instructions, that when executed by a machine, configure the machine to perform operations comprising:

adjusting, using ground control points (GCPs), image geometry in metadata of a two-dimensional (2D) first image of a region to match image geometry of a three-dimensional (3D) point set of the region to generate a registered first image, the GCPs independent from the 3D point set;

adjusting, using the GCPs, image geometry in metadata of a 2D second image of the region to match image geometry of the 3D point set to generate a registered second image;

identifying, based on the 3D point set, geometric tie points of the registered first image and the registered second image;

projecting, using an affine transformation determined based on a least squares fit of the identified geometric tie points, pixels of the registered first image to an image space of the registered second image to generate a registered and transformed first image; and providing signals that cause a display to provide a view of the registered and transformed first image and the registered second image simultaneously.

18. The at least one non-transitory machine-readable medium of claim 17, wherein the geometric tie points are at substantially a same elevation based on the 3D point set and situated in a regular grid on the registered first and second images.

19. The at least one non-transitory machine-readable medium of claim 18, wherein x,y points of the grid are projected to the image space of the registered first image and the registered second image to generate geometric tie point coordinates between the images, and the operations further include generating the affine transformation to project the geometric tie point coordinates in the registered first image to the geometric tie point coordinates in the registered second image.

20. The at least one non-transitory machine-readable medium of claim 17, wherein the operations further comprise determining a corresponding pixel in the registered first image to which a transformed projected first image pixel of the transformed projected first image pixels corresponds using a bilinear interpolation.

* * * * *